United States Patent [19]

Miksitz

[11] Patent Number: 4,506,811

[45] Date of Patent: Mar. 26, 1985

[54] MECHANICAL CONSTRUCTION ARRANGEMENT FOR ROTARY PLOW FEEDER

[75] Inventor: Frank J. Miksitz, Phillipsburg, N.J.

[73] Assignee: UFI Engineering & Manufacturing Co., Inc., Bethlehem, Pa.

[21] Appl. No.: 386,669

[22] Filed: Jun. 9, 1982

Related U.S. Application Data

[63] Continuation-in-part of Ser. No. 291,765, Aug. 10, 1981, Pat. No. 4,411,377.

[51] Int. Cl.$^3$ .............................................. B65G 21/18
[52] U.S. Cl. ..................................... 222/411; 198/778
[58] Field of Search ............... 222/193, 342, 410, 195; 198/778; 222/630, 637, 367, 411

[56] References Cited

U.S. PATENT DOCUMENTS

| | | | |
|---|---|---|---|
| 243,716 | 7/1887 | Marks | 222/441 X |
| 2,100,216 | 11/1937 | Hughes | 222/411 X |
| 2,814,399 | 11/1957 | McIlhenny et al. | 198/778 X |

Primary Examiner—Stanley H. Tollberg

Attorney, Agent, or Firm—Cushman, Darby & Cushman

[57] ABSTRACT

In a rotary feeder for feeding granular material downwardly with gravity assist through a feed aperture: a stationary container having a side wall and having a generally horizontal wall in which the feed aperture is located; a rotatable feed assembly located above the feed aperture, the assembly including a vertical shaft and a plow blade secured to the shaft for contacting granular material and urging it over the edge of the feed aperture; a support fixture fixedly connected to the container, the fixture including a stationary, vertically-elongated, stiff support axle coaxial with the feed assembly shaft; vertically spaced-apart bearings coaxial with the feed assembly shaft and connected to the feed assembly shaft and to the stationary support axle such that the feed assembly is rotatable about a vertical axis relative to the stationary support axle and such that the weight of the feed assembly is supported by the stationary support axle; and a drive device supported independently of the support fixture, the drive device being drivably connected to the feed assembly to rotate the same relative to the support fixture.

8 Claims, 5 Drawing Figures

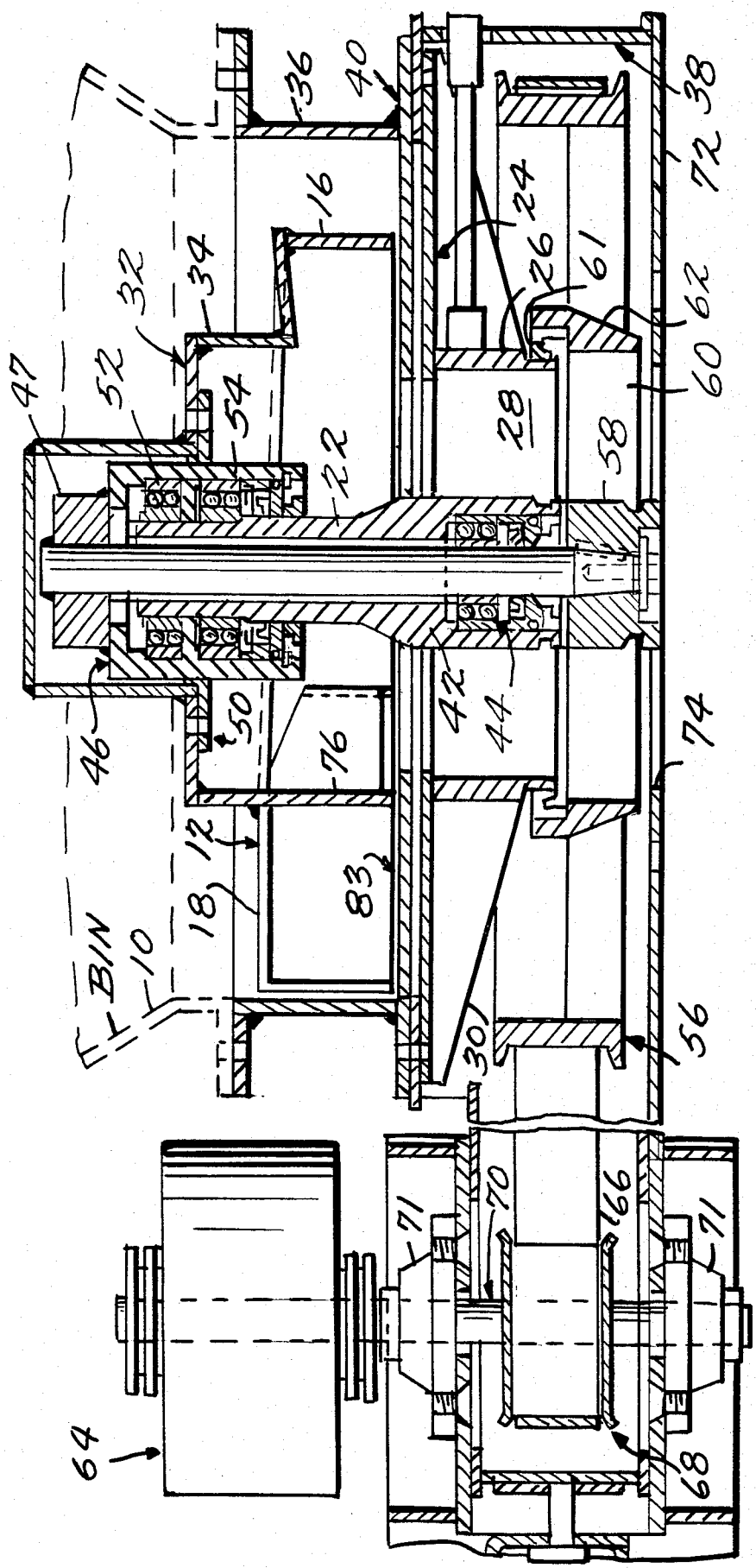

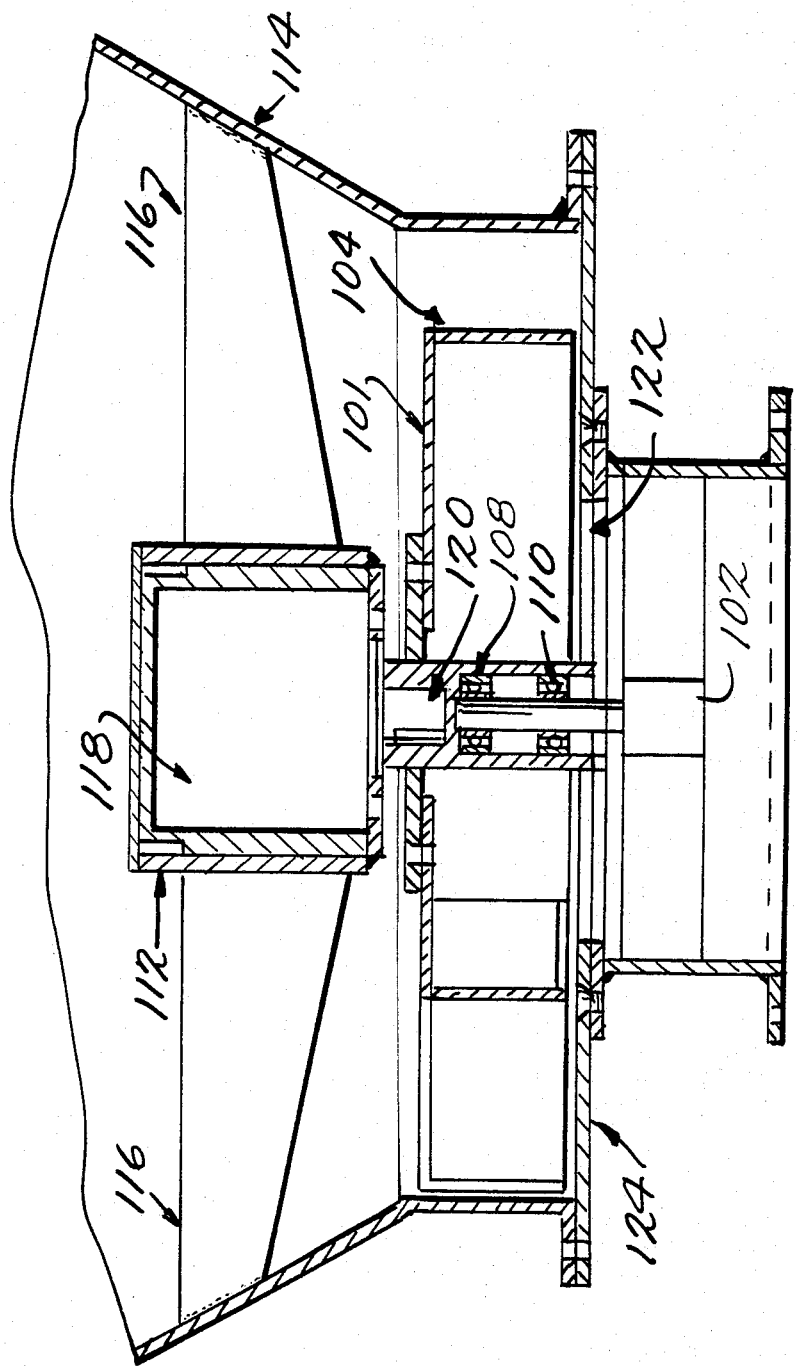

MECHANICAL CONSTRUCTION ARRANGEMENT FOR ROTARY PLOW FEEDER

This is a continuation-in-part of application Ser. No. 291,765 filed Aug. 10, 1981, now U.S. Pat. No. 4,411,377.

The present invention relates to rotary plow feeders and in particular to an improved mounting arrangement for supporting the rotary plow, the drive means for the plow and the design of a more efficient operating plow.

BACKGROUND AND PRIOR ART

In general a rotary plow feeder includes a bin, hopper or other container for bulk granular material having a bottom wall provided with a feed aperture through which granular material is fed by a rotary plow device located above the aperture and close to the bottom wall. Rotation of the plow device about the vertical axis of the aperture results in the urging of granular material toward the aperture and over the edge of the aperture to fall by gravity from the container.

Examples of prior art rotary plow feeders are described in U.S. Pat. Nos. 217,628, 243,716, 371,881, 1,856,361, 3,036,745 and 4,020,980.

An example of a more recently developed rotary plow feeder is described in U.S. patent application Ser. No. 291,765 of which the present application is a continuation-in-part. The feeder described in that application, the disclosure of which is incorporated herein by reference, employs a specially shaped plow blade or scoop which provides particularly efficient flow of granular material uniformly and simultaneously over essentially the whole of the periphery of the feed aperture during rotation of the blade.

SUMMARY OF THE INVENTION

According to the principal feature of the present invention the weight of the rotary plow device is rotatably supported, via bearings, on a stiff, robust stationary vertical axle arranged coaxially with the feed aperture and secured to the bulk material container so as to transfer the weight of the plow device to the container. The plow device is thus freely rotatable relative to the axle. During rotation of the plow device within the bulk material being fed forces generated by the plow device tend to bend the axle and these binding forces are transmitted to the container walls by the connection between the container and the axle. In one form of construction the weight of the motor drive for the plow device is supported independently of the stationary axle; in this case reaction forces on the motor casing are transmitted independently by the connection between the motor casing and the ultimate motor support, usually a different part of the container. In another form of construction the weight of the motor drive is supported by the stationary axle.

In one embodiment the stationary axle is arranged inside and coaxial with a motor-driven tubular plow support member which is rotatably mounted on the axle by two or more vertically spaced-apart by ball bearings or roller bearings and which is rigidly connected to the plow. The inner races of the bearings are fixed to the exterior of the axle and the outer races are fixed to and rotate with the plow support tube. In a modification of this embodiment the tubular support member or its equivalent is part of the motor, for example a hydraulic motor of the rotating casing type.

In another embodiment the stationary axle is tubular and coaxially surrounds a rotatable drive shaft rigidly connected to the plow. Vertically spaced-apart bearings each have one race fixed to the axle and the other race fixed to the drive shaft.

According to another aspect of the invention the outer portion of the shroud plate of the plow device is inclined downwardly away from the entry opening (i.e., in a direction opposite to the direction of scoop rotation) in order to reduce friction between the shroud plate and the bulk material, thereby reducing drive power requirements and increasing feeding efficiency.

BRIEF DESCRIPTION OF THE DRAWINGS

FIG. 1 is a vertical sectional view through the lower end portion of a bulk material container fitted with a feed device embodying the principles of the present invention;

FIG. 4 is a fragmentary vertical sectional view through the lower end of a bulk material container fitted with a second embodiment of a feed device according to the present invention.

DETAILED DESCRIPTION

Figure 3:
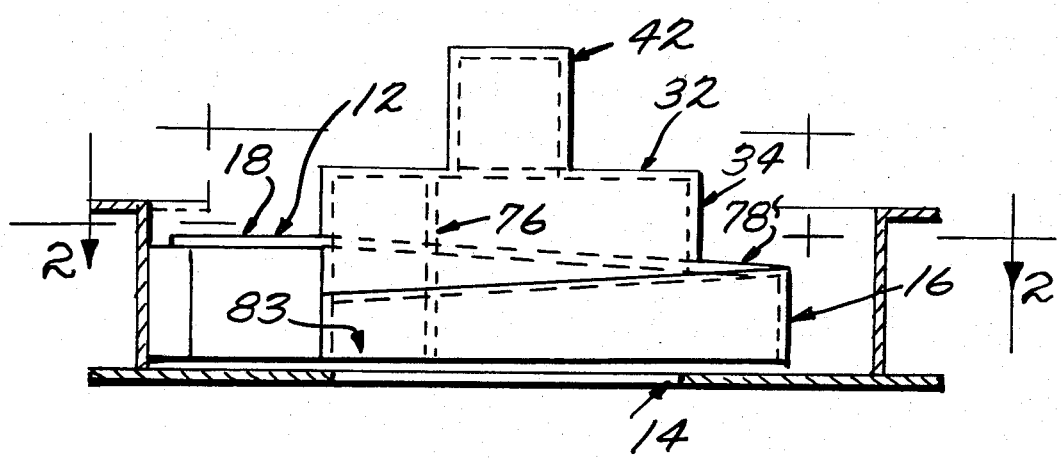
FIG. 3 is a vertical sectional view taken on the line 2A—2A of FIG. 2.

FIG. 1 illustrates in vertical section the lower end of a bulk material container such as a bin 10, fitted with a rotary scoop feeder supported in a manner contemplated by the present invention. The feeder includes a rotary plow in the form of a scoop 12 which is disposed above and concentric with a downwardly facing main feed aperture 14. The shape of the scoop 12 and its cooperation with bulk material in the bin 10 to feed the material in a radially inward direction over the edge of the feed aperture 14 may be generally the same as described in the aforementioned patent application Ser. No. 291,765. The components of the scoop 12 are a plow blade 16 which is spirally curved about the axis of rotation of the scoop 12 and a cover or shroud plate 18, cylinder 34, and plate 32 fixed to the upper edge of the plow blade 16.

Figure 2:
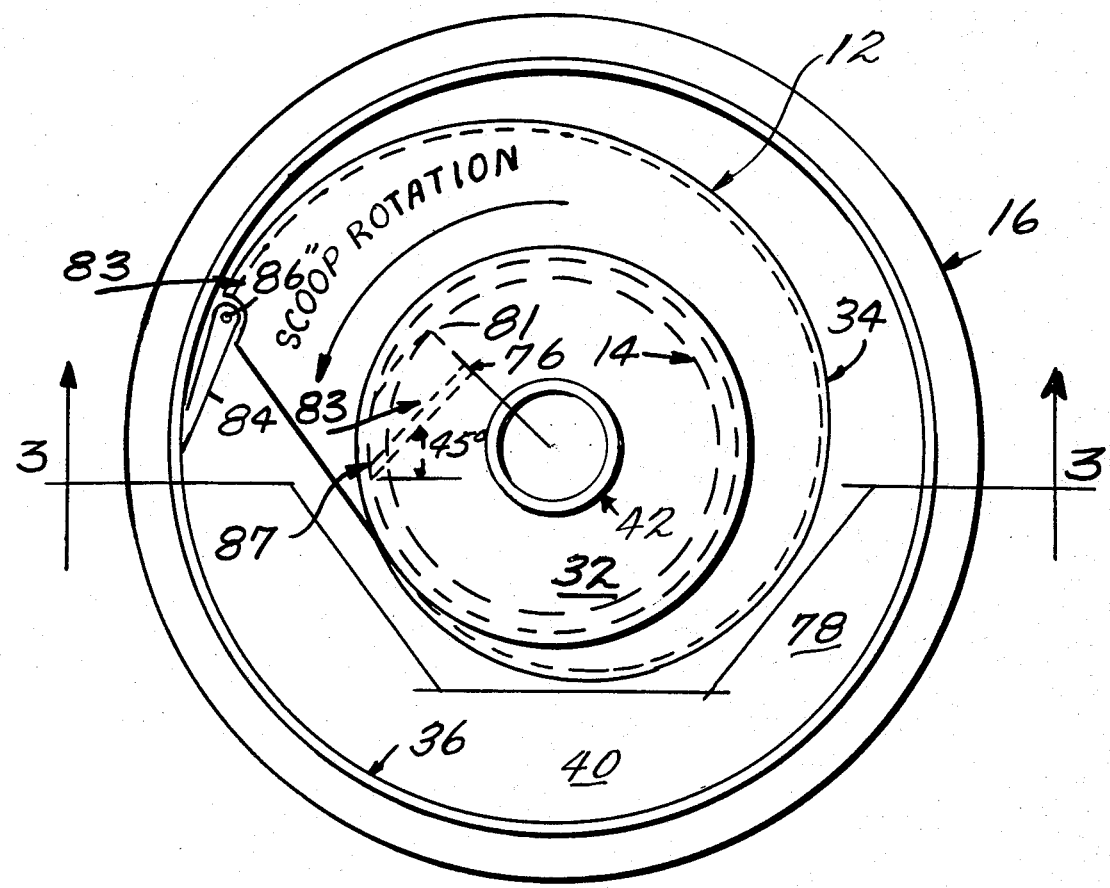
FIG. 2 is a horizontal sectional view taken on the line 2—2 of FIG. 1.

The weight of the scoop 12 and of the components secured thereto is supported by a vertical stationary axle 22 which in turn is supported by the container 10. In the embodiment of FIGS. 1 and 2 the stationary axle 22 is part of an assembly which includes an annular support plate 24 surrounding the axle 22 and a hollow cylindrical member 26 welded to the lower surface of the annular plate 24. Radial spokes 28 extend between the axle 22 and the inner surface of the cylindrical member 26 and gusset plates 30 are secured to the lower surface of the plate 24 and to the exterior of the cylindrical member 26. The peripheral portion of the annular plate 24 is clamped between flanges on two hollow cylindrical housings 36,38, the housing 36 being secured to the lower end of the bin 10. An annular wear plate or feeder floor 40 overlies the plate 24. The apertures in the plates 24 and 40 form the feed aperture 14.

The scoop 12 is part of a rotatable assembly which includes a motor-driven vertical scoop drive shaft 42 coaxially arranged within the stationary axle 22. Near its lower end the drive shaft 42 is connected to the axle 22 by a bearing 44 having an inner race fixed to and rotatable with the drive shaft 42 and an outer race fixed to the stationary axle 22. The upper end of the drive shaft 42 projects upwardly through a tubular housing 46 which is rigidly connected to the scoop 12. The shaft 42 is rigidly connected to the tubular housing 46 by being welded to a plate 47 which is welded to the tubular housing 46. The connection of the housing 46 to the scoop 12 includes a flange ring 50 welded to the exterior of the housing 46 and bolted to the periphery of an aperture in the shroud plate portion 32. The housing 46 is connected to the axle 22 by two vertically spaced-apart bearings 52,54 each having a stationary inner race fixed to the exterior of the axle 22 and a rotatable outer race fixed to the inner surface of the housing 46. Alternatively, a single bearing may be provided, rather than the two bearings 52,54.

The lower end of the scoop drive shaft 42 carries a concentric chain sprocket or belt sheave 56 having a hub 58 bolted to the drive shaft 42 and a plurality of radial spokes 60 extending between the hub 58 and the sheave 56. A sliding seal is formed between the lower end of the stationary cylindrical member 26 and the upper end of a hollow cylindrical member 62 which is arranged concentrically within the sheave 56 and fixed in place by the spokes 60. A ring-shaped rubber lip seal 61 is fixed to the upper end of the member 62 and slidably engages the periphery of the stationary member 26 during rotation of the sheave 56 to prevent bulk material from escaping from the members 26 and 62 in a radially outward direction.

The sheave 56 is driven by an electric motor and speed reducer unit 64 via a toothed belt 66 or a chain looped over a toothed sheave or sprocket 68 on the motor output shaft 70. The unit 64 and its associated parts are supported by flange bearings 71 which are supported from the housing 38 the latter being in effect part of the bin 10. The drive system for the scoop 12 is thus supported by the bin 10 independently of the support for the stationary axle 22.

The lower end of the housing 38 is fitted with a cover plate 72 having an aperture 74 therein through which bulk material passes during rotation of the scoop 12.

As seen in FIG. 2 the plow blade 16 is spirally curved along its entire length, the spiral being a gradual one such that tangents at right angles to radii lie essentially outside the periphery of the scoop. The illustrated curvature is similar to an involute curve. The blade 16 should extend completely around the feed aperture 14; in the illustrated embodiment the blade 16 extends somewhat more than 360°. The innermost end plate 76 of the blade 16 terminates beyond the periphery of the feed aperture 14 and at the same time there is a space 78 between the blade 16 and the periphery located at 360° or more (beginning at the outer end 80 of the blade 16) so that granular material can surround the aperture 14 before being plowed over the edge of the aperture 14. The innermost end 76 of the blade 16 has a segment plate 83 attached at a right angle to the bottom edge of the end 76 to cover the opening between the feed aperture 14 and the blade end 76.

To prevent flushing of particularly pourable granular material through the mouth 82 of the scoop 12 and through the feed aperture 14 the innermost end plate 76 of the plow blade 16 is extended spirally somewhat further than is necessary for plowing. This end is sloped to provide an edge which faces upwardly and in the direction of rotation of the plow 16. A segment plate 83 is attached to the plow blade end 76 to provide an extension of the floor plate out over the edge of the feed aperture 14 to prevent flushing and thereby enable the end 76 to be bent away from the entrance of the scoop 12. This allows easier, more efficient flow of bulk material into the entrance of the scoop 12. The end plate 76 terminates 45° from a tangent at point 87, and the space or opening left between the outermost end of the plate 76 and point 81 is filled in by a flat segment-shaped bottom plate 83 attached to the plate 76. With this construction bulk material cannot flush by gravity down through the feed aperture 14.

The shroud plate portion 18 can be horizontal and attached to a constant height plow blade 16 as in FIG. 4. Preferably, as shown in FIGS. 1 and 3 it is inclined or sloped downwardly in a direction opposite the direction of rotation of the scoop 12. The central shroud plate portion 32 is circular so that the inclined portion 18 has the form of a helix descending in the direction opposite the direction of rotation of the scoop 12, starting with the scoop inlet and terminating 360° away, adjacent the scoop inlet and at a lower height on the blade 16. With this construction the scoop 12 operates more efficiently, with less friction, because the top surface of the shroud plate 18 now moves away from the burden of bulk material as the scoop 12 rotates. This is analogous to moving an inclined plane out from under a load. The weight of the load on the inclined plane produces a force component which works with and assists movement of the inclined plane away from the load. Additionally, the spirally descending shroud plate 18 "jacks" the burden of bulk material gradually downward to the floor of the feeder as the scoop rotates. There is no abrupt drop-off of material from the shroud plate to the floor of the feeder as with a horizontal constant height shroud plate. The material is constantly moving down to the floor as the scoop rotates forming a uniform bed of material on the floor of the feeder ahead of the scoop entry, resulting in a more efficient flow of bulk material through the feeder.

The inside diameter of the sloping shroud plate 18 is fixed to the lower helix cut edge of cylinder 34 so as to meet the sloping shroud plate 18 so it can be attached to it. The upper edge of the cylinder 34 intersects the horizontal plate 32 so it also can be fixed, and the inside diameter 32 is made to be fixed to the cylinder 42 with cap plate and it is made so that it is attached by bolts to the tubular bearing housing 50.

To prevent jamming of certain kinds of granular material between the outer leading end of the plow blade, this outer end is disposed in sliding contact with the housing side wall 10. This can be accomplished by having the outer end portion of the blade formed as a flap 84 separate from the remainder of the blade 16 and by attaching the flap 84 to the remainder by a hinge 86 having a vertical pivot axis. The forward edge of the flap 84 is preferably a knife edge and it may project beyond the shroud 18 in the direction of scoop rotation. As the hinge 86 is located at a radially inward position relative to the knife edge, the flap 86 is biased into contact with the side wall of the bin by the reaction force of the bulk material during rotation of the scoop 12.

In operation of the feeder the scoop 12 is rotated counterclockwise about the axis of the spiral plow blade 16. Granular material in the bin 10 is enveloped by the mouth 82 of the scoop 12 and is eased, gradually to the entire periphery of the feed aperture 14. The tangential force components at the tangents on the periphery of the blade lie outside that periphery and this indicates a low sliding force along the blade 16. Therefore, the flow of material is smooth, without backsliding in the direction of scoop rotation, because the material is being enveloped in a gradual sweeping motion and gradually moves toward the feed aperture along the whole periphery thereof. More specifically, there is relatively high friction between the granular material and the bottom wall 40 and at any given point along the blade 16 there is relatively low friction between that point and the granular material. The high essentially static bottom-wall friction is sufficient to overcome the lower sliding friction at the concave surface of the blade, and as a result there is no tendency for the sweeping action of the blade 16 to move any of the material in the direction of scoop rotation. That is, the only movement of the material is inwardly toward the feed aperture 14. Consider, for example, the conditions at start-up, with an empty scoop cavity within the scoop 12 and with the scoop 12 embedded in the stationary bulk material in the housing. Upon counterclockwise rotation of the scoop 12, the mouth 82 of the latter cuts into the stationary material without causing any movement of the material in the direction of scoop rotation. The first material to be contacted by the concave surface of the blade 16 will begin to be urged radially inwardly and some of this material will be pushed over the edge of the feed aperture 14 beginning at the inner end of the blade. However, as the spiral curvature of the blade 16 is gradual the scoop will rotate approximately 360° without discharging all of the initially enveloped material. That is, at the end of the first revolution of the scoop 12 there will be a mass of granular material disposed along the entire periphery of the feed aperture 14, including the space adjacent the inner end 76 of the blade 16, this mass of material having been moved radially by the blade but not moved in the direction of blade rotation. At the beginning of the second revolution of the scoop 12, and thereafter, granular material will be pushed over the entire periphery of the feed aperture continuously and uniformly, thereby forming a uniform downwardly flowing annular stream. The spirally descending shroud plate portion 18 reduces the power requirement of the feeder because the inclined surface of portion 18 is always moving away from the bulk material on top of it. This helps to bring the material down to the floor of the feeder more efficiently and to prepare it for entry into the scoop 12.

Assembly of the feeder is as follows. The components 22, 42, 44, 52 and 54 are assembled to form a unit which is installed in the housing 38. The housing 36 and wear plate 40 are positioned over the housing 38 and bolted thereto. The scoop 12 is attached by bolts passing through the shroud portion 32 and the flange ring 50 which is welded to the member 46. After the above components are in place, the sheave 56, the belt 66, and the sheave 68 are installed. Then the motor and speed reducer unit 64 and the cover plate 72 are installed.

Maintenance, except replacement of the scoop 12 can be done without emptying the bin 10. Access to the bearing 44 for replacement thereof is accomplished by removing the cover plate 72 and the sheave 56 and then removing the assembly 46 by removing the bolts connecting members 32 and 50. The scoop drive shaft 42 and the bearings 52 and 54 are also accessible, after removing the housing 38.

FIG. 4 illustrates an embodiment in which a stationary support axle 102 for a rotary scoop 104 is arranged coaxially within a tubular scoop drive shaft 106. The axle 102 is connected to the drive shaft via vertically spaced-apart bearings 108,110 each having an inner stationary race fixed to the exterior of the axle 102 and an outer rotatable race fixed to the inner surface of the drive shaft 106. These bearings support the weight of the scoop 104. Coaxially surrounding the drive shaft 106 is a stationary tubular housing 112 fixed to the side wall of a bin 114 by a plurality of radial spokes 116. A hydraulic motor 118 is mounted on the upper end of the housing 112 and has its output shaft 120 connected to the drive shaft 106.

The scoop 104 has a horizontal shroud plate 101 but can be the same as the scoop 12 of FIGS. 1 and 2 and is arranged above a feed aperture 122 in the bottom wall 124 of the bin 114.

In the illustrated embodiment the motor is indirectly supported by the bin by the members 112 and 116. Alternatively the motor casing can be directly connected to the bin 114.

The motor 118 provides a rotary force, via its output shaft 120, which is transmitted to the scoop 104 by the tubular drive shaft 106. The reaction force to the rotation force of the motor 118 is absorbed by the housing 112 and is transmitted to the side wall of the bin 114 by the spokes 116. The bending and torsional forces induced by rotation of the scoop in a bed of bulk material in the bin 114 are carried by the stationary axle 102 and by the output shaft 120 and tubular shaft 106.

Figure 5:
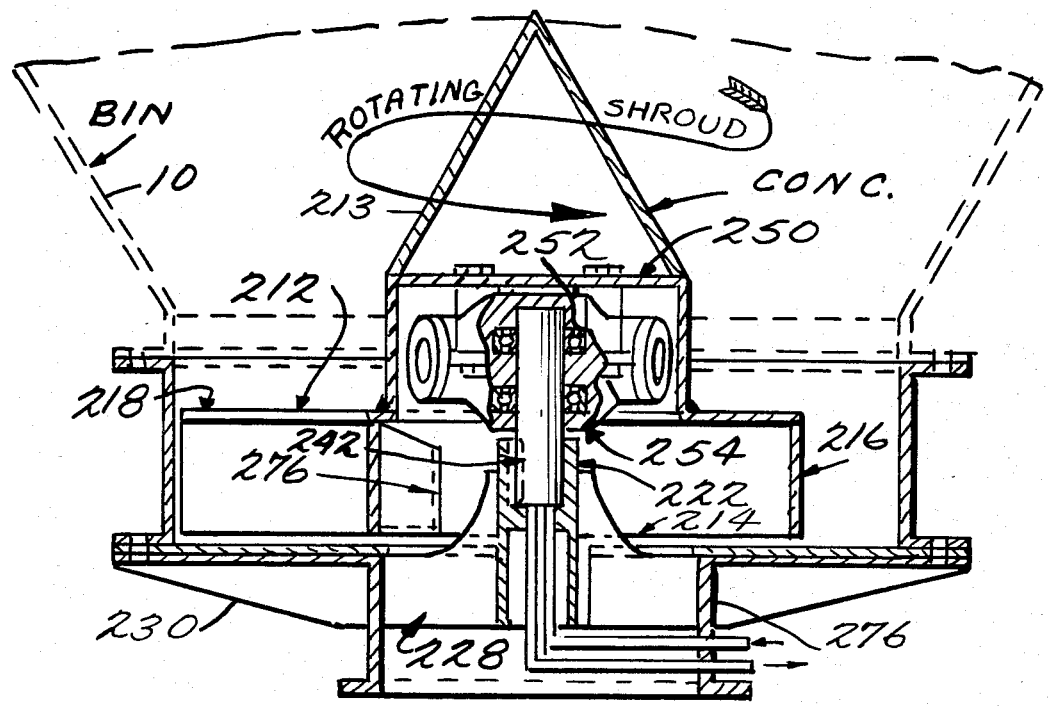
FIG. 5 is a vertical sectional view of a third embodiment of a feed device.

FIG. 5 illustrates an embodiment in which the bearing support between a stationary container-supported axle and the rotatable scoop is an internal part of the motor drive for the scoop. In this embodiment the scoop 212 is similar to the previously described scoop but differs in that it includes an inverted cone-shaped shroud 213. The motor 211 is a hydraulic motor having a rotating casing and a stationary shaft 242 protruding therefrom. The casing is bolted to a horizontal plate 250 forming part of the scoop 212 so that in operation of the motor the casing and the scoop 212 rotate around the stationary shaft 242. Inside the casing and forming part of the motor are two vertically spaced-apart bearings 252 and 254, each having an outer race connected to and rotatable with the motor casing and a stationary inner race connected to the stationary shaft 242. The bearing support members in the motor casing thus function as a drive shaft for the scoop 212. Hydraulic supply and exhaust conduits for the motor 211 pass axially through the shaft 242.

The motor 211 may be a conventional rotating case type of hydraulic motor and therefore a detailed description of the motor is not necessary.

The stationary motor shaft 242 is keyed to a concentric stationary axle 222 which is fixed to the housing 226 by radial plates or spokes 228 and welded to the axle 222 and to the housing 226. The weight of the motor casing and the scoop 112 is transmitted by the bearings 252, 254 to the stationary motor shaft 242 and then to housing 226 via the stationary axle 222 and the spokes 228.

What is claimed is:

1. In a rotary feeder for feeding granular material downwardly with gravity assist through a feed aperture: a stationary container having a side wall and having a generally horizontal wall in which the feed aperture is located; a rotatable feed assembly located above the feed aperture, said assembly including a vertical shaft and a plow blade secured to the shaft for contacting granular material and urging it over the edge of the feed aperture; a support fixture fixedly connected to the container, said fixture including a stationary, vertically-elongated, stiff support axle coaxial with said feed assembly shaft; vertically spaced-apart bearing means coaxial with said feed assembly shaft and connected to said feed assembly shaft and to said stationary support axle such that said feed assembly is rotatable about a vertical axis relative to said stationary support axle and such that the weight of said feed assembly is supported by said stationary support axle; and drive means supported independently of said support fixture, said drive means being drivably connected to said feed assembly to rotate the same relative to said support fixture.

2. A feeder as in claim 1 wherein said vertically elongated support fixture is tubular and wherein said feed assembly shaft and said vertically spaced-apart bearing means are disposed within said tubular fixture.

3. A feeder as in claim 1 wherein said feed assembly shaft is tubular and wherein said vertically elongated support fixture and said vertically spaced-apart bearing means are disposed within said tubular shaft.

4. A feeder as in claim 1 or 2 wherein said plow blade is continuously curved in a generally spiral path along essentially its entire length about an axis coinciding with the axis of said feed aperture, the outer end of the plow blade being disposed close to the container side wall and the inner end of the plow blade being disposed adjacent said feed aperture, said feed assembly further including a shroud plate overlying and connected to said plow blade so that the shroud plate, plow blade and container bottom wall form a scooping cavity into which granular material flows from the container along a path located between the end portions of the plow blade and from which granular material flows uniformly and simultaneously over essentially the whole of the periphery of said feed aperture in the form of an annular stream during rotation of the feed assembly.

5. A feeder as in claim 1 or 2 wherein the drive connection between said feed assembly shaft and said drive means includes a sheave coaxially surrounding and connected to the lower end portion of said shaft, a driven sheave horizontally offset from said coaxial sheave and an endless drive member looped around said sheaves, said coaxial sheave being located below said horizontal wall of said container and being of greater diameter than said feed aperture.

6. A feeder as in claim 1 or 3 wherein the drive connection between said feed assembly shaft and said drive means includes a driven stub shaft coaxial with and connected to the upper end portion of said feed assembly shaft.

7. In a rotary plow feeder for feeding granular material downwardly with gravity assist through a feed aperture in a bottom container wall, an improved rotatable feed assembly located above the feed aperture said assembly including a plow blade which is continuously curved in a generally spiral path along essentially its entire length about an axis coinciding with the axis of the feed aperture and which extends essentially around the whole of the periphery of the aperture; a shroud overlying and connected to the plow blade so that the shroud, blade and container bottoms form a spiral scooping cavity having an entry opening and a discharge opening, the portion of the shroud overlying the spiral scooping cavity being spiral and inclined downwardly from the entry opening essentially continuously along the length of the scooping cavity.

8. A rotary plow feeder as in claim 7 wherein said plow blade, scooping cavity and inclined shroud extend at least 360° around the feed aperture.

* * * * *